United States Patent [19]

Brede et al.

[11] Patent Number: 5,388,860
[45] Date of Patent: Feb. 14, 1995

[54] SAFETY DEVICE FOR PROTECTING THE PASSENGER OF A MOTOR VEHICLE FROM INJURY IN A COLLISION

[75] Inventors: Uwe Brede, Furth; Josef Kraft, Berg, both of Germany

[73] Assignee: Dynamit Nobel Aktiengesellschaft, Troisdorf, Germany

[21] Appl. No.: 203,593

[22] Filed: Feb. 28, 1994

Related U.S. Application Data

[63] Continuation of Ser. No. 957,909, Oct. 8, 1992, abandoned.

[30] Foreign Application Priority Data

Oct. 10, 1991 [DE] Germany ............... 4133506

[51] Int. Cl.⁶ .............................. B60R 21/28
[52] U.S. Cl. ...................... 280/739; 280/736; 280/742
[58] Field of Search ............. 280/736, 740, 742, 739

[56] References Cited

U.S. PATENT DOCUMENTS

| | | | |
|---|---|---|---|
| 3,747,953 | 7/1973 | Goes et al. | 280/739 |
| 4,394,033 | 7/1983 | Goetz et al. | 280/736 |
| 4,846,368 | 7/1989 | Goetz | 280/736 |

FOREIGN PATENT DOCUMENTS

| | | |
|---|---|---|
| 2520238 | 7/1983 | France . |
| 2324571 | 11/1973 | Germany . |
| 3147780 | 9/1982 | Germany . |
| 1-229739 | 9/1989 | Japan ............... 280/736 |

*Primary Examiner*—Eric D. Culbreth
*Attorney, Agent, or Firm*—Antonelli, Terry, Stout & Kraus

[57] ABSTRACT

The safety device has a gas generator for generating gas, which is accommodated in a rigid housing. The housing is open at one side and is sealed in this region by an originally folded sheet of a gas cushion. When igniting the gas generator, the sheet unfolds outwards over the open side and forms the gas cushion filled with gas under pressure. The gas escapes by way of at least one escape opening, formed in a housing wall, with a variable effective cross-sectional area, when the passenger pitches into the gas cushion. The effective cross-sectional area is altered by a temperature-controlled escape opening-adjusting device so that at high gas internal pressures, the cross-sectional area is greater than at lower gas internal pressures. With this arrangement, the temperature-dependent alterations in the catching or impact reduction characteristic of the gas cushion are thereby compensated for.

4 Claims, 2 Drawing Sheets

SAFETY DEVICE FOR PROTECTING THE PASSENGER OF A MOTOR VEHICLE FROM INJURY IN A COLLISION

This application is a continuation application of application Ser. No. 957,909, filed Oct. 8, 1992 now abandoned.

BACKGROUND OF THE INVENTION

This invention relates to a safety device for protecting a passenger of a motor vehicle from injury in a collision, which has a gas cushion able to be inflated by gas, i.e. an airbag, a housing connected to the gas cushion and open on one side, a gas generator arranged in the housing for generating gas under pressure for filling the gas cushion and at least one escape opening for the gas under pressure to escape, particularly when the passenger pitches into the gas cushion.

Safety devices of this type, also called "airbag systems" function so that, if acceleration or deceleration forces, the absolute value of which exceed a predetermined magnitude, affect the motor vehicle, a gas generator accommodated in a housing in the automobile open on one side and otherwise closed is ignited and generates gas under pressure. The ignited gas generator generates gas under pressure, by means of which a gas cushion connected to the housing is filled (i.e. inflated). The gas cushion consists of a sheet formed into a bag or sack connected in a gas tight manner to the housing wall and sealing the housing towards the open side, said sheet consisting of a gas tight material such as plastic or tightly woven fabric and in which are formed escape openings such as apertures. Alternatively (filter) loosely woven fabric in which the interstices between the threads of the fabrics act as escape openings is also used as a material for the gas cushion. When the passenger to be protected pitches or impact into or impacts on the gas cushion filled with gas under pressure, additional pressure is applied to the gas contained therein, and therefore the gas is forced out of the gas cushion by way of the escape openings. The escape openings here have a throttling effect, by means of which the body or the passenger under impact is made to brake so much that critical accelerating values no longer affect him. The rate at which the gas generator generates the gas under pressure (volume of gas generated per time unit) is dependent on the temperature. With the gas compositions usually employed today in gas generators less gas is generated per unit time at the lower limit of the operating temperature to be considered from −35° C. to +85° C., than with the upper temperature limit. This has the result that the gas cushion is filled in a relatively taut manner at high (external) temperatures and moreover, the catching characteristic for the passenger to the protected is therefore different to that at low temperatures where the gas cushion is filled less markedly.

SUMMARY OF THE INVENTION

An underlying object of the invention is to create a safety device for protecting a passenger in a motor vehicle from injury in a collision, with which device, despite a different internal pressure in the filled gas cushion, the same braking ratio of the passenger pitching into the gas cushion is always substantially ensured over the complete operating temperature range being considered.

In order to achieve this object, it is provided according to the invention that, in the safety device of this invention, at least one escape opening is preferably arranged in a housing wall and that for at least this one escape opening a controllable escape opening-adjusting device is provided, which adjusts the total cross-sectional area of the at least one escape opening, such that the size of the total cross-sectional area of the at least one escape opening is altered in proportion to the internal pressure in the filled gas cushion.

According to the invention, different decelerating characteristics are compensated for depending on the gas cushion internal pressure, in that at least one escape opening which is preferably arranged in the housing wall has its cross-sectional area altered by a controllable adjusting device. With high internal pressures in the filled gas cushion, the at least one escape opening has a larger cross-section than at lower internal pressures in the gas cushion. Through this variability of the total cross-sectional area of the escape opening or the escape openings, the rate of gas flowing out (quantity of gas escaping per time unit) is altered, with this rate being greater, the greater the gas cushion internal pressure. A constant escape characteristic for the gas under pressure from the gas cushion when the passenger pitches into it is achieved as a result of the variability of the escape opening or the escape openings over the complete operating temperature range to be considered (−35° C. to +85° C.).

In addition to an evening-out or leveling of the escape behavior over the complete temperature range and the possibility linked with this of an improved protective effect for the passenger, an evening-out of the degree of filling over the entire temperature range is also achieved with the safety device according to the invention. The size of the escape opening or openings also has, in fact, an influence on the filling of the gas cushion with gas under pressure; this is because with a higher rate of generation of gas under pressure, more gas under pressure escapes from the system by way of the cross-sectional area of the escape opening which is relatively large even during inflation of the gas cushion, than is the case with a lower rate of generation of gas under pressure, Both components (evening-out of the degree of filling of the gas cushion and an evening-out of the escape behavior of the gas under pressure in each case over the complete temperature range) effect an evening-out of the braking behavior of the gas cushion affecting the passenger.

According to the invention, the compensation of the gas cushion damping characteristic, varying in dependence on the gas pressure, occurs in the first instance when the gas escapes, if the passenger to be protected impacts into the gas cushion, i.e. once the gas cushion is filled with gas. No compensation is intended when building up the gas cushion-internal pressure except for the influence of the varyingly wide opening of the at least one escape opening (heretofore noted); this is because it should firstly be ensured that the gas cushion is filled as quickly as possible and to quite different degrees. A compensation of the gas cushion damping characteristic by controlling the pressure build-up could result in the gas cushion filling at varying speeds in dependence on the operating temperature, which would mean compromises when designing the safety device.

The at least one controllable escape opening is preferably formed, as already mentioned, in the housing wall.

This is, however, not absolutely necessary. In a safety system, in which the combustion gases (pressure gases) are directed from the gas cushion out of the motor vehicle and not into the passenger area, the escape opening/s able to be controlled in their cross-section/s can, for example, also be arranged at the end of the pressure gas outlet pipe line connected to the housing interior by way of an opening.

In an advantageous further development, the control of the escape opening-adjusting device is dependent on the temperature instead of on the internal pressure or the rate of generation of gas under pressure. The dependence of the rate of generation of pressure gas on the temperature must at any rate be known here. If, for example, gas compositions are used in the gas generator, with which the rate of generation of gas under pressure is proportional to the temperature, i.e. with an increasing temperature, the quantity of gas under pressure delivered per time unit is greater, the size of the total cross-section of the at least one escape opening alters in proportion to the temperature. The determining of the (outer) temperature, i.e. the temperature to which the safety device is also exposed, and the temperature-dependent control of the escape opening-adjusting device are technically substantially simpler to realize than a control of the escape opening-adjusting device dependent on internal pressure or on the rate of generation of gas under pressure.

The alteration of the effective cross-sectional area of the escape opening or, with several escape openings, the alteration of the effective total cross-sectional area of the escape openings (sum of the cross-sectional areas of all escape openings) is advantageously achieved by a displaceable control slide valve, in particular displaceably guided on the housing, for opening and closing the escape opening or openings. The escape opening-adjusting device here has, in addition to the control slide valve, a drive device for continuous or bistable movement of the control slide valve, so that the proportion of the cross-sectional area, closed by the control slide valve, of at least one escape opening or total cross-sectional area of all escape openings, can be influenced.

In an advantageous further development of the invention it is provided that the drive device is formed as a bimetallic bar, which is securely mounted at one of its ends and in its freely displaceable section is coupled to the control slide valve in order to move this. If the movement of the bimetallic bar is not sufficient relative to the degree of alteration of movement as well as to the force applied during movement, a gear unit for transferring the movement of the bimetallic bar to a control slide valve movement can be arranged between the bimetallic bar and the control slide valve.

Instead of using a control slide valve, however, any other possible closing device can also be used, with which the cross-sections of openings can be altered in a simple manner. For example closing devices can also be used which work like an iris diaphragm.

When forming several escape openings to influence the escape characteristic of the gas under pressure, in particular when the passenger pitches into the gas cushion, it is, in principle, possible to alter (simultaneously) and continuously all escape openings relative to their cross-section with the escape opening-adjusting device. It is, however, also envisioned that the escape openings are joined together in groups, each group of escape openings being provided with a common closing device equipped with a drive device, or each escape opening of each group having a separate closing device with a separate drive device. With a combination of the escape openings in groups, the escape opening-adjusting device can be controlled such that, depending on the gas internal pressure, the rate of generation of gas or the temperature, the escape openings are opened or closed in groups. With an increasing temperature, increasing gas pressure or increasing rate of generation of gas an increasing number of escape openings is opened or closed; the drive devices for the different groups of escape openings respond therefore to different temperatures. In an escape opening-adjusting device formed such that the escape openings no longer need to be opened or closed continuously; it is sufficient if the closing devices assume only two states, namely the open-state in which the escape opening or openings are fully open or the closed state in which the escape opening or openings are completely closed.

When forming several escape openings to influence the escape characteristic of the gas under pressure and the simultaneous alteration of all escape openings with the escape opening-adjusting device it is provided, according to an advantageous further development of the invention, that the escape openings are arranged in rows side by side, and that, if the case arises, several such rows are arranged below each other and in that the control slide valve has several openings, which, when several escape opening rows are present, extend over all escape openings arranged in one column. The control slide valve openings are in each case able to be aligned with the escape openings of in each case one column, with the amount of escape opening cross-section closed by the control slide valve being able to be altered by movement of the control slide valve. In this design of the invention all escape openings can be altered in their cross-sections by a common closing device, namely the control slide valve or the control plate.

In addition to the escape openings provided for the purpose of influencing the behavior of the escape of the gas under pressure from the gas cushion, the safety device, according to the invention, can also have escape openings, which are not able to be altered. With these escape openings it is, for example, a case of escape openings being in the gas cushion, such as provided with the safety devices used hitherto. The safety device according to the invention can also be used with an "airbag" system, the gas cushion of which consists of the woven material used hitherto, i.e. with escape openings formed therein.

Provided that escape openings combined to form several groups are provided for influencing the escape characteristic, the closing device for each group of escape openings preferably consists of a separate control slide valve with a separate drive device, with each drive device preferably having a bimetallic bar and each bimetallic bar being variable in its temperature characteristic compared with the remaining bimetallic bars.

BRIEF DESCRIPTION OF THE DRAWINGS

In the following an exemplifying embodiment of the invention will be described in more detail with reference to the accompanying drawings, wherein.

DETAILED DESCRIPTION OF THE INVENTION

Figure 1:
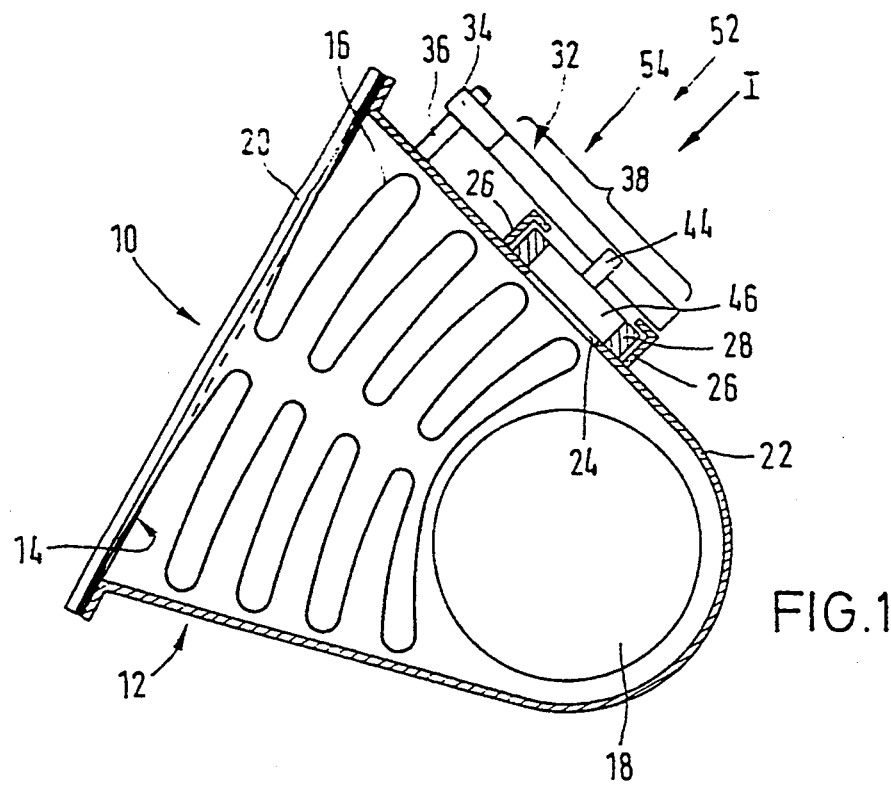
FIG. 1 shows, in detail, a cross-section through a housing with a gas generator and folded gas cushion.

The component parts of the safety device 10 are shown diagrammatically in the drawing according to FIG. 1. The safety device 10 has a housing 12 open on one side, the open side 14 of which is sealed by a fabric or skin 16 of a gas cushion accommodated in the housing 12 and folded when the safety device 10 is not active. Accommodated in the housing 12 on the end opposite the open side 14 is a gas generator 18. On ignition of the gas generator 18 by conventional means responsive to acceleration or deceleration forces, gas under pressure is generated; after which the internal pressure in the housing 12 rises. As a result of the increased internal pressure a protective cap 20 placed in the region of the open side 14 of the housing 12 with a predetermined breaking point (not represented) is detached. When the protective cad 20 is detached, the sheet 16 emerges via the open side 14 from the housing 12 and forms a gas cushion filled with the gas under pressure from the gas generator 18.

Several escape openings 24 are arranged in the wall 22 of the housing 12, side by side in a row. As can be seen, in particular in FIG. 1, the housing wall 22 is provided in the region of the escape openings 24 on their outer side with guide and holding angle strips 26. These strips 26, which are 90° angle sections, project from the outer side of the housing wall 22 and extend parallel to each other at both longitudinal sides of the row of escape openings 24. Together with the housing wall 22, the ledges 26 form C-shaped guides lying opposite each other for a control slide valve 28 arranged therebetween. The control slide valve 28 is held and guided in both directions, indicated by a double arrow 30 (note FIG. 2), on the housing 12 in a longitudinally displaceable manner between the guide and holding angle strips 26.

Coupled to the control slide valve 28 there is a bimetallic bar 32, one end 34 of which is mounted in a rotation-tight manner on a positioning pin 36, which is connected, for its part, in a rotation-tight manner to the housing wall 22. The bimetallic bar 32 is arranged at a distance from the housing wall 22 and extends parallel to this, with its freely displaceable section 38 projecting over the control slide valve 28. The bimetallic bar 32 consists in a known manner of two stock bars 40, 42, with different thermal expansion coefficients. The faces of the two stock bars 40, 42, facing each other are connected to each other such that a displacement of both stock bars 40, 42 relative to each other is prevented. The end section of the freely displaceable section 38 of the bimetallic bar 32, opposite the end 34, extends between two bearing pins 44 connected to the control slide valve 28.

Figure 2:
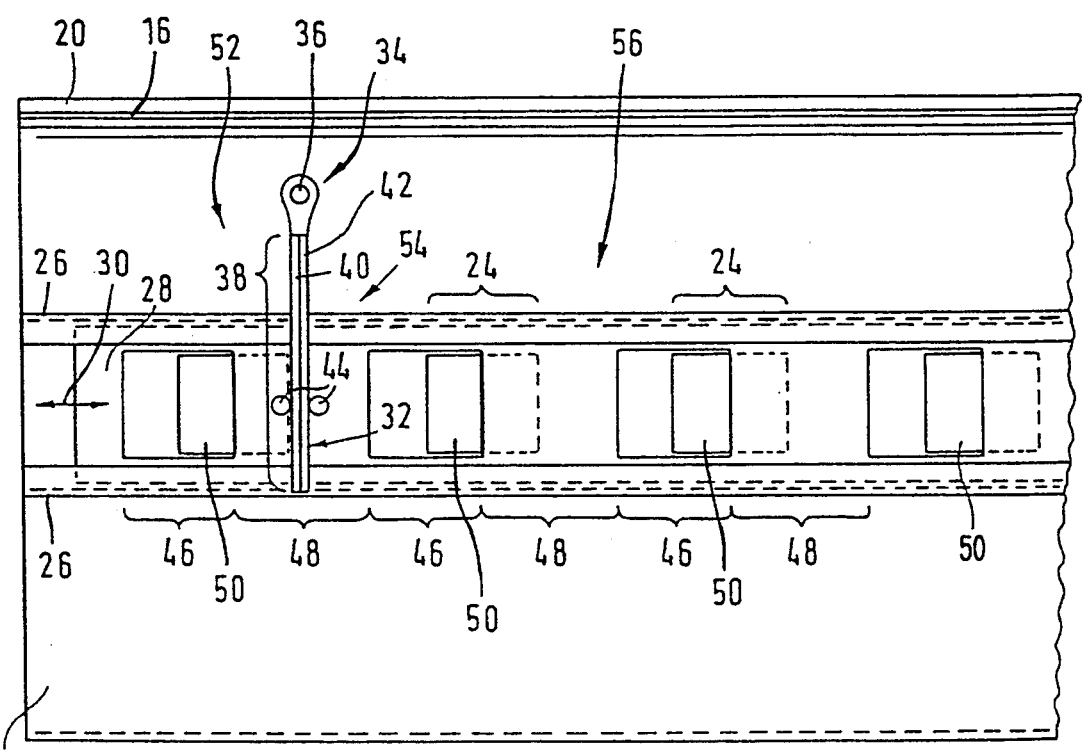
FIG. 2 shows, in detail, a side view of the housing in the direction of the arrow I of the FIG. 1 at an average temperature within the temperature range to be considered.
Figure 3:
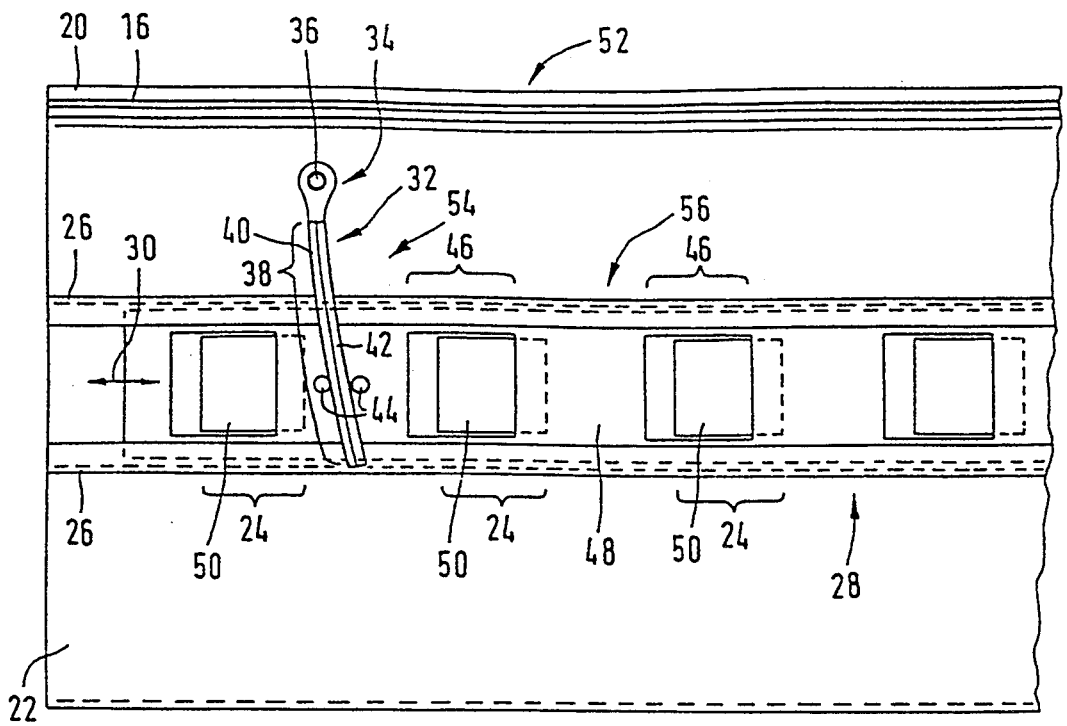
FIG. 3 shows, in detail, a side view of the housing in the direction of the arrow I of FIG. 1 at a high temperature within the temperature range under consideration.
Figure 4:
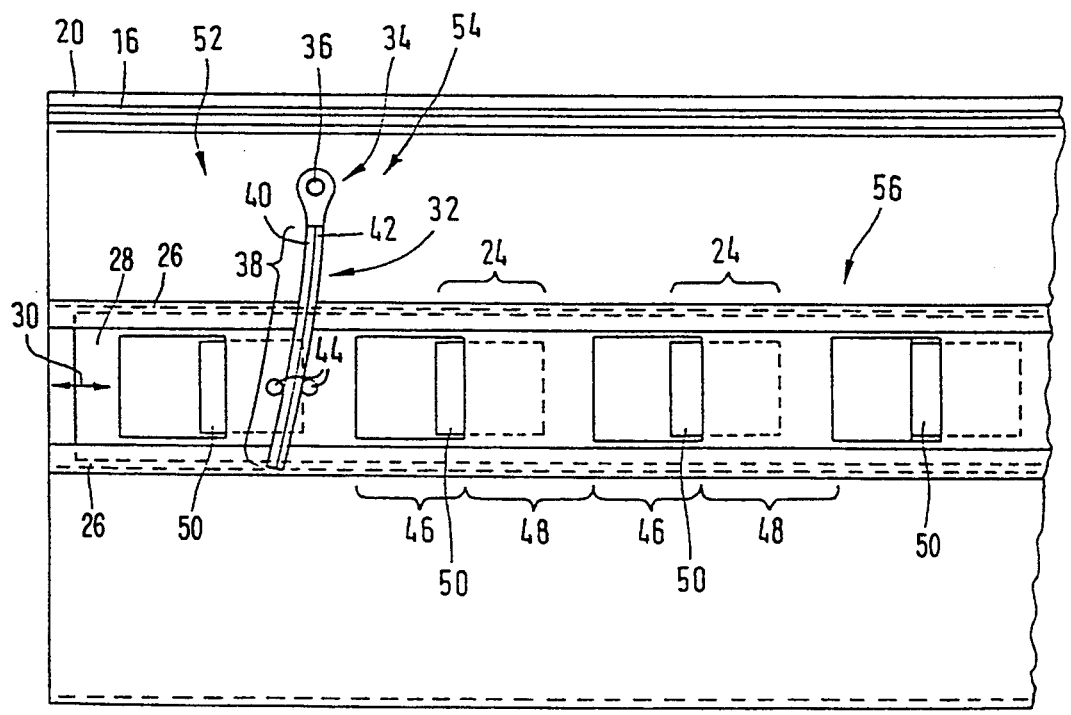
FIG. 4 shows a side view of the housing in the direction of the arrow I of the FIG. 1 at a low temperature within the temperature range to be considered.

The freely displaceable section 38 of the bimetallic bar 32 bends either to one side or to the other side, depending on the temperature. In FIG. 2 the position of the bimetallic bar 32 is shown at an average temperature within the temperature range considered of −35° C. to +85° C. for which the vehicle passenger-safety device 10 is designed. FIG. 3 shows the direction of the bending of the bimetallic bar 32 at higher temperatures, with the control slide valve 28 being displaced in the direction of the arrow 30. Finally, FIG. 4 shows the direction of the bending of the bimetallic bar 32 at lower temperatures, with the control slide valve 28 being displaced in the direction of the arrow 30.

As can be seen with the aid of the drawings, the control slide valve 28 is provided with several openings 46 spaced evenly from each other. The openings 46 partially overlap the escape openings 24 in the housing wall 22 also arranged evenly spaced from each other. Depending on the position of the displacement of the control slide valve 28 relative to the escape openings 24, a larger or a smaller part of the slide openings 46 is aligned with a portion of the escape openings 24. The control slide valve 28, therefore, more or less covers the escape openings 24 with its closing sections 48 located between its openings 46 and, to be more precise, in dependence on its position of displacement, which for its part is dependent on the temperature. The effective cross-sectional area 50 for each escape opening 24, by way of which the gas under pressure escapes with the impact of the passenger on the filled gas cushion, can, therefore, be altered depending on the temperature. The cross-sectional alteration takes place in such manner, that, with an increasing temperature, the effective cross-sectional area 50 of each escape opening 24 is enlarged and is reduced with a decreasing temperature. Because of the gas composition used in the gas generator 18 when there is an increasing temperature generating an expanding quantity of gas, the gas of the gas cushion under greater pressure at high temperatures can be carried away more quickly when the passenger strikes the gas cushion, than at lower temperatures where the internal pressure in the gas cushion is lower because of the lower rate of generation of gas at these low temperatures. Altogether in this way an evening-out of the escape behavior of the gas under pressure is achieved over the complete temperature range.

The device consisting of control slide valve 28 with its openings 46 and closing sections 48 and the bimetallic bar 32 as well as the bearing pins 44 is designated as an escape opening-adjusting device 52 for altering the total cross-sectional area 50 of the escape openings 24. The bimetallic bar 32 has, moreover, the function of a drive device 54 for adjusting a closing device 56, by means of which the escape openings 24 are able to be closed to a greater or less degree. The escape opening-adjusting device 52 can be controlled by temperature in the exemplifying embodiment represented in the figures, which, in a gas generator with a rate of generation of gas proportional to the temperature results in a control, dependent indirectly on the rate of generation of gas or on the gas cushion internal pressure.

What is claimed is:

1. A safety device for protecting a passenger of a motor vehicle from injury in a collision, which comprises:
    a gas cushion able to be inflated by gas;
    a housing connected to the gas cushion and open on one side;
    a gas generator arranged in the housing for generating gas under pressure for filling the gas cushion; and
    at least one escape opening for allowing the gas under pressure to escape from the housing, when the passenger pitches into the gas cushion, characterized in that the at least one escape opening is provided in a wall of the housing and a controllable escape opening-adjusting device is provided which adjusts the total cross-sectional area of the at least one escape opening such that the size of the total cross-sectional area of the at least one escape opening is altered in proportion to the internal pressure in the filled gas cushion and in that the escape opening-adjusting device is controlled depending upon the temperature so that, with a rate of generation of gas under pressure proportional to the temperature, the size of the total cross-section of the at least one escape opening is altered proportionally to the temperature; said escape opening-adjusting device comprising a displaceable control slide valve for opening and closing the at least one escape opening and a drive device for the control slide valve which moves the control slide valve for altering the proportion of the total cross-sectional area of the at least one escape opening closed by the control slide valve and the drive device comprising a bimetallic bar which is fastened at one of its ends to the housing and which is coupled to the valve, in one section of a freely displaceable region extending from the other end, in order to displace the control slide valve.

2. A safety device according to claim 1, characterized in that the escape openings are arranged evenly spaced from each other along one row and in that the control slide valve has several openings, which are arranged side by side in a row with, in each case, one opening of the control slide valve extending over an escape opening in a perpendicular direction to the row of escape openings.

3. A safety device for protecting a passenger of a motor vehicle from injury in a collision, which comprises:
   a gas cushion able to be inflated by gas;
   a housing connected to the gas cushion and open on one side;
   a gas generator arranged in the housing for generating gas under pressure for filling the gas cushion; and
   several escape openings for the gas under pressure provided in the housing to allow gas to escape from the housing, characterized in that a controllable escape opening-adjusting device is provided which adjusts the total cross-sectional area of the several escape openings such that the size of the total cross-sectional area of several escape openings is altered in proportion to the internal pressure in the filled gas cushion, the cross-sections of all escape openings being altered by means of the escape opening-adjusting device and characterized in that the escape opening-adjusting device for the escape opening has a displaceable control slide valve for opening and closing the several escape openings and in that the control slide valve has a separate drive device which displaces the control slide valve for altering the proportion of cross-sectional area closed by the valve of the several escape openings and the drive device comprises a bimetallic bar varying in its temperature-dependent behavior, which is fastened at one of its ends and which is coupled to the valve, in one section of a freely displaceable region extending from the other end, in order to displace the control slide valve and the alteration of the proportion of the total cross-sectional area, closed by a control slide valve, of each escape opening varies with displacement of the control slide valve.

4. A safety device for protecting a passenger of a motor vehicle from injury in a collision, which comprises:
   a gas cushion able to be inflated by gas;
   a housing connected to the gas cushion and open on one side;
   a gas generator arranged in the housing for generating gas under pressure for filling the gas cushion; and
   several escape openings for allowing the gas under pressure to escape from the housing when the passenger pitches into the gas cushion, characterized in that the escape openings are provided in a wall of the housing and a controllable escape opening-adjusting device is provided which adjusts the total cross-sectional area of the escape openings such that the size of the total cross-sectional area of the escape openings is altered in proportion to the internal pressure in the filled gas cushion and in that the escape opening-adjusting device is controlled depending upon the temperature so that, with a rate of generation of gas under pressure proportional to the temperature, the size of the total cross-section of the escape openings is altered proportionally to the temperature; said escape opening-adjusting device comprising a displaceable control slide valve for opening and closing the escape openings, and cross-sections of all escape openings being altered by means of the escape opening-adjusting device, the escape openings being arranged evenly spaced from each other along at least one row and the control slide valve having several openings which are arranged side-by-side in a row with, in each case, one opening of the control slide valve extending over an opening in a perpendicular direction in the row of escape openings.

* * * * *